United States Patent [19]

Matsushima et al.

[11] Patent Number: 5,269,536
[45] Date of Patent: * Dec. 14, 1993

[54] SEALING DEVICE

[75] Inventors: Noboru Matsushima; Noriyuki Wada, both of Fukushima, Japan

[73] Assignee: NOK Corporation, Tokyo, Japan

[*] Notice: The portion of the term of this patent subsequent to Jan. 1, 2008 has been disclaimed.

[21] Appl. No.: 685,270

[22] Filed: Apr. 15, 1991

[51] Int. Cl.⁵ .............................................. F16J 15/32
[52] U.S. Cl. ....................................... 277/35; 277/37; 277/38; 277/53; 277/153
[58] Field of Search ...................... 277/37, 35, 38, 153, 277/50, 47, 48, 52, 152, 53

[56]       References Cited
          U.S. PATENT DOCUMENTS

| 3,011,814 | 12/1961 | Rhoads et al. | 277/37 |
| 3,021,161 | 2/1962 | Rhoads et al. | 277/37 |
| 3,108,815 | 10/1963 | Haynie et al. | 277/37 |
| 3,114,558 | 12/1963 | Rhoads et al. | 277/37 |
| 4,226,426 | 10/1980 | Messenger | 277/37 |
| 4,252,329 | 2/1981 | Messenger | 277/37 |
| 4,327,922 | 5/1982 | Walther | 277/37 |
| 4,376,541 | 3/1983 | Walter et al. | 277/50 X |
| 4,428,586 | 1/1984 | Romero | 277/38 X |
| 4,448,426 | 5/1984 | Jackowski et al. | 277/37 |
| 4,981,303 | 1/1991 | Matsushima et al. | 277/37 |
| 5,096,207 | 3/1992 | Seeh et al. | 277/35 |
| 5,201,529 | 4/1993 | Heinzen | 277/37 |

Primary Examiner—William A. Cuchlinski, Jr.
Assistant Examiner—James K. Folker
Attorney, Agent, or Firm—Armstrong, Westerman, Hattori, McLeland & Naughton

[57]       ABSTRACT

A sealing device in accordance with the present invention includes a projected portion having a rubber-like elastic member on the outer periphery of a seal member, and an outer cylindrical portion extending toward the seal member on a flange portion of a sleeve member. This outer cylindrical portion covers an opening formed between the seal member and the flange portion, thereby preventing entry of dust. The outer cylindrical portion is further provided on the tip thereof with a bend portion which can be engaged with the projected portion. The projected portion, the outer cylindrical portion, and the bend portion form a small clearance which serves as a labyrinth seal. The projected portion is fixedly fitted with a protection ring for covering the opening formed between the seal member and the flange portion of the sleeve member so that the free end portion of the protection ring can be engaged with the flange. This free end portion of the protection ring and the flange portion form a small clearance, and this small clearance serves as a labyrinth seal.

4 Claims, 5 Drawing Sheets

SEALING DEVICE

BACKGROUND OF THE INVENTION

1. Field of the Invention

This invention relates to a sealing device for sealing two members which are relatively rotating, and more particularly to a, sealing device which is unitized.

2. Description of the Related Art

One sealing device 100 such as shown in FIG. 9 is conventionally available. The sealing device 100 comprises a seal member 101 to be mounted onto a housing 104 and a sleeve member 102 to be mounted onto a shaft. The seal member 101 is provided with a metal ring 103 made up of a cylindrical portion 101a and an inwardly directed flange 101b. This metal ring 103 is provided with baked and molded rubber-like elastic members on both sides of the periphery thereof, and has a rubber portion 105 which is fitted into the inner periphery or the housing 104.

From the inwardly directed flange portion 101b, a seal lip 106 is extended such that the seal lip 106 slidably contacts the outer periphery of the sleeve member 102 to seal a sealing liquid.

The seal lip 106 is provided with a dust lip 107 on the atmosphere side thereof to prevent entry of dust in the atmosphere into the device.

The inwardly directed flange 101b is further provided with a seal end projection 108 which is in contact with the sleeve member 102 to bring the inwardly directed flange 101b into contact with the sleeve member 102.

The inner periphery of the sleeve member 102 is provided with a fitted portion 109 made of a rubber-like elastic member which is in contact with the shaft.

A second example of the conventional sealing device will be shown in FIG. 10. This sealing device 110 also comprises a seal member 111 and a sleeve member 112. The seal member 111, is provided with a seal lip 113, a dust lip 114, and a seal end portion 116 which is in contact with an end surface of the sleeve member 112. Reference numeral 115 designates a bend portion formed by bending the end portion of the sleeve member 112.

Further, a third example of the conventional sealing device will be shown in FIG. 11. This sealing device 120 consists of four (4) components. That is, the device 120 comprises an outer ring 121, and an inner ring 122, and the assembly of a seal member 124 and a sleeve member 123 is contained within the outer ring 121 and the inner ring 122.

As shown in FIG. 12 as a fourth example, an integrated type sealing device is known, in which a protection ring 133 is fitted into the outer periphery of a seal member 134 and covers the opening formed between the seal member 134 and a sleeve member 132 (U.S. Pat. No. 4,448,426).

However, in the first example of the conventional sealing device 100, the seal member 101 and the sleeve member 102 are not integrated and thus are mutually separable. When the bearing plays, or the shaft moves in the direction of the arrow in FIG. 9 during its repair or overhaul causing a clearance to be formed between the projection 108 of the seal end surface and the sleeve member 102. The device as a result easily admits dust and sludge into an internal space. This causes the dust lip 107 and the seal lip 106 to be worn in a short period of time, thereby impairing the durability of the device.

The opening provided between an end surface 130 on the atmosphere side of the seal member and the sleeve member 102 allows external dust, sludge or the like to directly reach the projection 108. This causes not only the sliding portion to be worn in a short period of time but also a clearance to be formed, thereby allowing further entry. Moreover, the detachable construction of the device may additionally require careful handling so as not to damage the lip portion of the seal lip 106.

In the second example of the conventional sealing device 110, which is the example of a unitized device consisting of two components, the assembling operation requires the insertion of the sleeve member 112 into the seal member 111 and bending of an end portion 115 of the sleeve member 112.

Accordingly, the problems exist in the bending operation of the end portion 115 of the sleeve member 112 which is an additional process in assembling and in the construction which is subject to entry of dust as is the case with the first sealing device 100.

In the third example of the conventional sealing device 120, the number of components reaches as many as four (4), thereby not only complicating the assembling process but also increasing the cost.

In the fourth example of the sealing device which is of the integral structure and in which the opening is covered, the protection ring 133 is fixed. This not only causes the shaft to be either eccentrically rotated or eccentrically mounted during mounting operation but also causes the protection ring 133 to interfere with the rotating sleeve member 132 with an axially applied thrust. As a result, the rubber material deteriorates due to exposure to excessive heat and its life is significantly reduced.

To avoid such problems, a large clearance is given between the two members 133, 132. This large clearance, however, impairs the sealing performance against dust and sludge entering from outside.

SUMMARY OF THE INVENTION

This invention has been made in view of the above problems and has as an object the improvement of the sealing performance, particularly, against dust.

Another object of this invention is to reduce the cost and simplify the assembling process by decreasing the number of components.

Still another object of this invention is to improve the durability by controlling deformation, breakage, or excessive heat generation of the relatively moving members when they are in contact.

According to this invention, the above objects can be achieved by a sealing device comprising a seal member having a seal lip for sealing a sealed liquid in slidable contact with a sleeve member, and a dust lip for preventing entry of dust from the atmosphere side thereof. The sleeve member comprises a flange portion protruding so as to face the atmosphere side of the seal member. The seal member is provided with a projected portion having a rubber-like elastic member on the outer periphery thereof, while the flange portion of the sleeve member is provided with an outer cylindrical portion for covering an opening formed between the flange portion and the end portion on the atmosphere side of the seal member and for being covered by the projected portion of the outer periphery of the seal member through a small clearance. The tip of the outer cylindrical portion is provided with a bend portion which is bent so as to axially overlap through the projected portion and the small clearance, or the projected portion is fixedly fitted into a protection ring for covering an opening formed between the end portion on the atmosphere side of the seal member and the flange portion of the sleeve member. The free end portion of the protection ring is extended to the atmosphere side of the flange portion and mounted so as to axially overlap through the outer end of the flange portion and a small clearance.

DESCRIPTION OF THE PREFERRED EMBODIMENTS

This invention will be described in detail with reference to the drawings.

Figure 1:
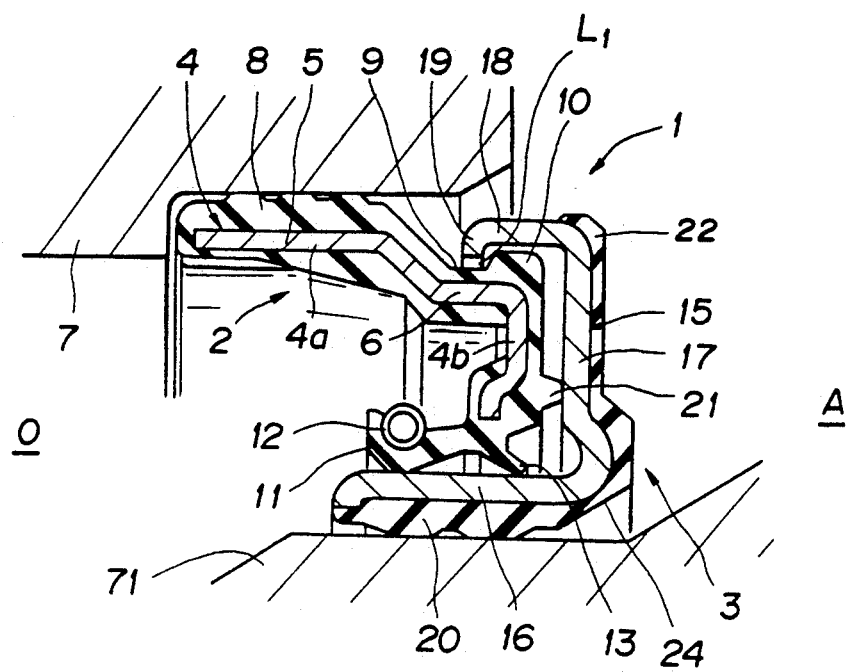
FIG. 1 is a longitudinal sectional view of the main portion of a sealing device which is a first embodiment of the invention.

FIG. 1 shows a sealing device which is a first embodiment of the invention. The sealing device 1 for sealing a shaft 71 as an inner member and a housing 7 as an outer member, both being mounted so as to be concentrically and relatively rotatable, comprises a seal member 2 to be mounted onto the housing 7 and a sleeve member 3 to be mounted onto the shaft 71.

The seal member 2 has a metal ring 4, the metal ring 4 comprises an outer cylindrical portion 4a and an inwardly directed flange 4b, while an outer cylindrical portion 4a comprising a greater diameter portion 5 and a smaller diameter portion 6. The seal member 2 is further formed with a rubber portion 8 which is fitted into the mating housing 7, and a recessed portion 9 and a projected portion 10, both provided on the outer periphery portion of the smaller diameter portion 6.

On the other hand, an end portion of the bore of the inwardly directed flange 4b of the metal ring 4 is provided with a seal lip 11, and a garter spring 12 is mounted to the outer periphery of the seal lip 11 to apply a torque to the seal lip 11.

The seal member 2 is further provided with a dust lip 13 for preventing entry of dust on the atmosphere side A of the seal lip 11. The seal lip 11 and the dust lip 13 are in slidable contact with the outer periphery portion of the sleeve member 3. The sleeve member 3 is made up of a U-shaped metal ring 15, the U-shaped metal ring 15 being composed of an inner cylindrical portion 16 which extends in parallel to an outer periphery cylindrical portion 4a of the metal ring 4 of the seal member 2, a flange portion 17 which radially protrudes in the outward direction from the end periphery on the atmosphere side, and an outer cylindrical portion 18 which extends toward a sealed liquid 0 to be axially sealed from the tip of the flange portion 17. This outer cylindrical portion 18 not only covers an opening formed on the outer diameter side between the end surface on the atmosphere side of the seal member 2 and the flange portion 17 but also is covered by a projected portion 10 provided on the smaller diameter portion 6 of the seal member 2 through a small clearance $L_1$, while a bend portion 19 at the tip thereof is inserted into the recessed portion 9 through the small clearance. The bend portion s disposed so as to axially overlap the recessed portion 9 and integrally assemble the seal member 2 and the sleeve member 3.

A rubber-like elastic member 20 is attached by baking to the inner periphery of the inner cylindrical portion 16 of this U-shaped metal ring 15 so that the U-shaped metal ring 15 is fitted to the relatively rotatable shaft 71 under a fluid dense condition. The rubber-like elastic member 20 has a guide taper 24, the guide taper 24 serving as a guide in mounting the sealing device 1 in a predetermined location. The lateral surface on the atmosphere side of the flange portion 17 is also covered by a rubber-like elastic member 22. On the other hand, the end surface on the atmosphere side of the seal member 2 is provided with an annular projection 21 which comes in contact with the flange portion 17 of the sleeve member 3.

Figure 2:
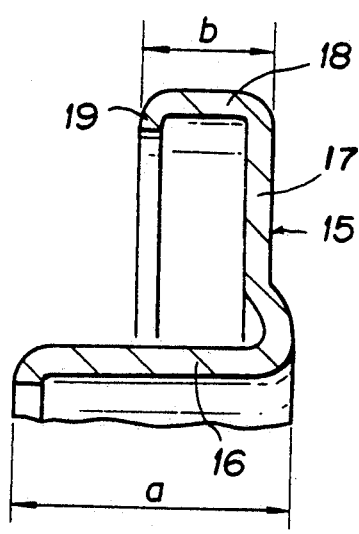
FIG. 2 is a longitudinal sectional view of the main portion of the metal ring provided on the sleeve member of the device shown in FIG. 1.
Figure 3:
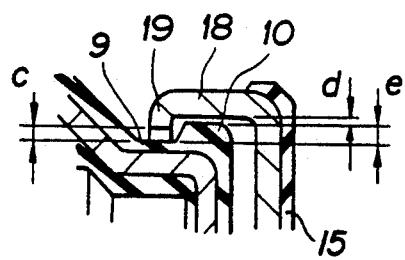
FIG. 3 is fragmentary longitudinal sectional view of the labyrinth portion shown in FIG. 1.

FIG. 2 shows the U-shaped metal ring 15. If it is supposed that the length of the inner cylindrical portion 16 is a and that of the outer cylindrical portion 18 is b, the U-shaped metal ring 15 is arranged so that there is a relationship such as a>b. FIG. 3 shows an enlarged view of a part of FIG. 1. Here, it is supposed that the clearance between the bend portion 19 at the tip of the U-shaped metal ring 15 is c and the clearance between the recessed portion 9 and the projected portion 10 is e. It is further supposed that the clearance between the inner periphery of the outer cylindrical portion 18 of the U-shaped metal ring 15 and the projected portion 10 is d. Then, there are such relationships as d>0 and e>c, and the tip portion is radially bent so that c >0. The seal member 2 and the sleeve member 3 are unitized in this way.

Thus, the sealing device 1 unitizes the seal member 2 and the sleeve member 3, but permits a certain amount of eccentricity.

The arrangement in which the seal member 2 is slightly distanced from the sleeve member 3 could form a labyrinth seal L1 by the clearances formed between the outer cylindrical portion 18 of the U-shaped metal ring 15 and the bend portion 19, and recessed portion 9 and projected portion 10, thereby improving the sealing performance against dust.

Figure 4:
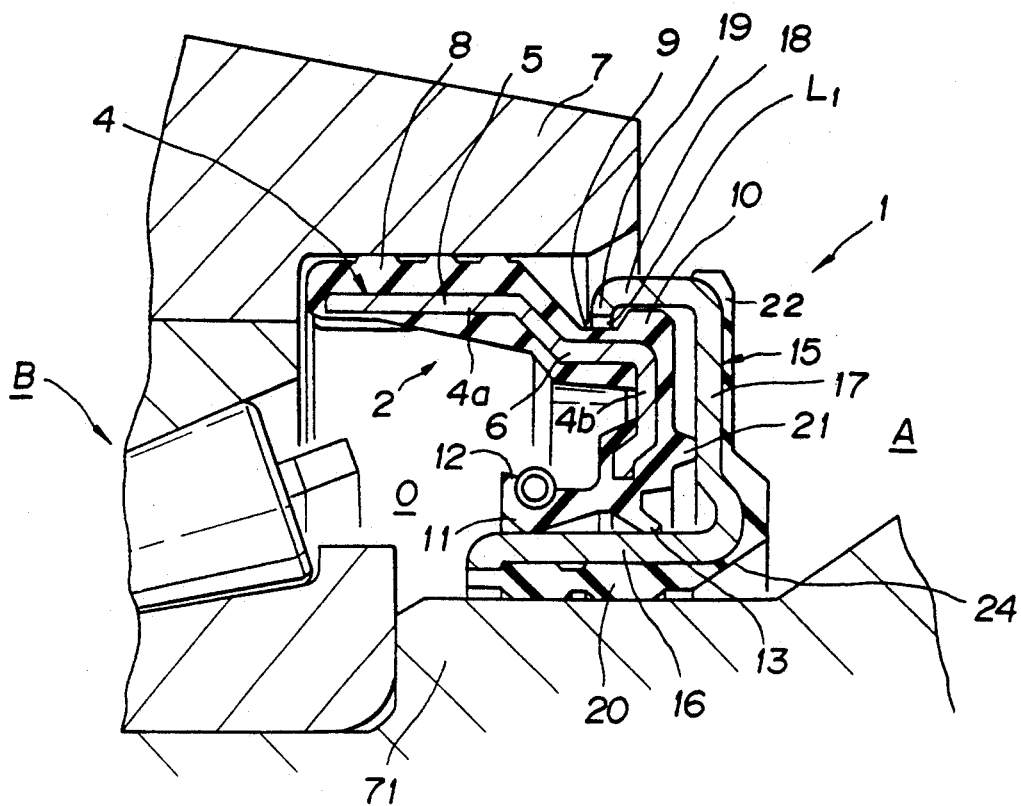
FIG. 4 is a longitudinal sectional view of the main portion of the device shown in FIG. 1 with a bearing mounted thereto.

FIG. 4 shows an example in which the sealing device 1 in the above embodiment is mounted together with a bearing B.

In this example, by using the U-shaped sleeve member 3 which allows the seal member to be unitized, it is possible not only to reduce the cost with reduced number of components but also to simplify the assembling process of the sealing device 1 allowing manual assembly.

Further, the sleeve member 3 is constructed as a slinger, so that the entry of external dust and splashes of sludge can be prevented, thereby significantly improving the sealing performance against dust.

Furthermore, the outer cylindrical portion of the sleeve member and the projected portion on the outer periphery of the seal member serve as a labyrinth seal, thereby significantly improving the sealing performance against dust.

Figure 5:
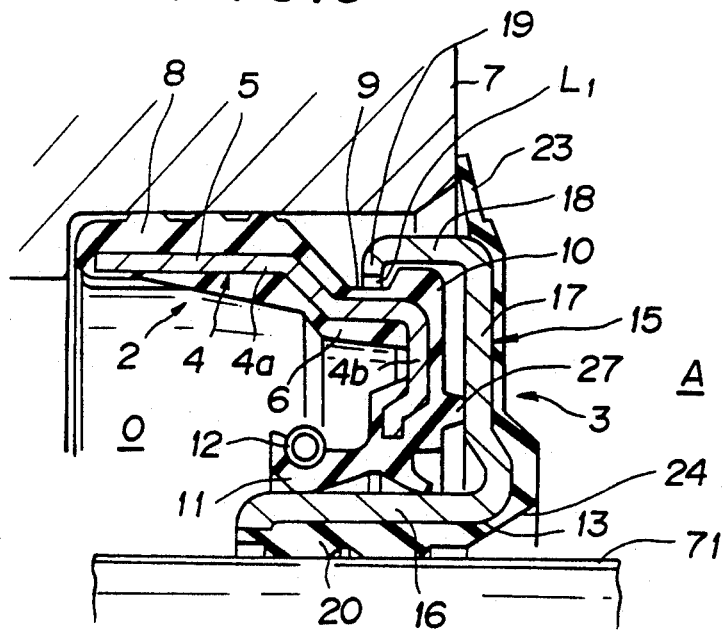
FIG. 5 is a longitudinal sectional view of the main portion of a sealing device which is a second embodiment of the invention.

FIG. 5 shows a second embodiment of the sealing device according to the invention. Parts and components which have the same functions as in the first embodiment will be referred to as the same reference numerals. In the second embodiment, the tip of a flange portion 7 of a sleeve member 3 is provided with an auxiliary dust lip 23 which is in hermetic contact with an end surface of a housing 7, whereby sealing performance against dust and sludge are far better than the first embodiment. The description of other constructions and operations will be omitted since they are the same as in the first embodiment.

Figure 6:
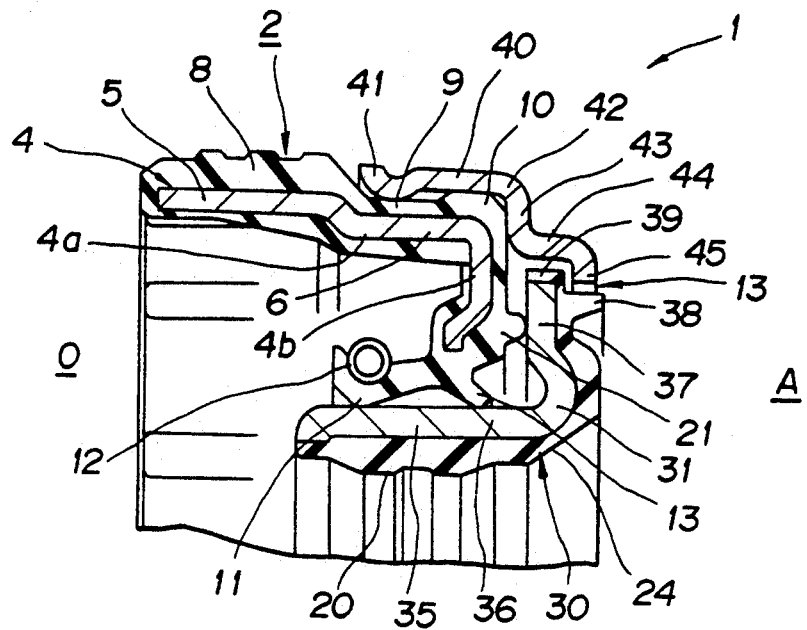
FIG. 6 is a longitudinal sectional view of the main portion of a sealing device which is a third embodiment of the invention.

FIG. 6 shows a third embodiment of the invention. Similarly in this embodiment, parts and components which have the same functions as in the first embodiment will be referred to as the same reference numerals.

In the third embodiment, a sleeve member 30 comprises a metal ring 35 whose section is substantially L-shaped, having an inner cylindrical portion 36 and a flange portion 37. There is provided no outer cylindrical portion 18 such as in the first embodiment. Instead, there is a protection ring 40 to cover an opening formed between an end portion of the seal member 2 and the flange portion 37 of the sleeve member 3. The protection ring 40 is fitted into the outer periphery of a recessed portion 9 and a projected portion 10 of the seal member 2.

An outer end portion 41 of the protection ring 40 is bent, and a bend portion 42 radially extends so as to surround the projected portion 10 and an end surface portion 43, and further an extended portion 44 which axially extends from the end surface portion 43.

The bending position at the boundary between the inner cylindrical portion 36 of the sleeve member 30 and the flange portion 37 are provided with a bend portion 31 which is bent so as to be projected toward the atmosphere side A.

From the extended portion 44, an end portion 45 which is bent to keep a small clearance with respect to a flange end 39 and a stepped lip 38 is provided. An end portion 45 is formed so as to cover the flange end 37. Thus, the protection ring 40 is provided on the recessed portion 9 and projected portion 10 by the outer end portion 41 so as to move in an axial direction. It is also provided with the end portion 45 of the flange end 37 which is bent so that it is provided with a small clearance relative to the stepped lip 38. The protection ring 40 is stepped by a greater diameter portion and a smaller diameter portion. Also, the smaller diameter portion of the protection ring 40 is provided with the bent end portion. Accordingly, the protection ring 40 can oscillate if a radial or axial load is applied thereto.

Also, a labyrinth L3 is formed between the extended portion 44 and the end portion 45 of the protection ring 40 and the flange end 37 and the lip 38.

Figure 7:
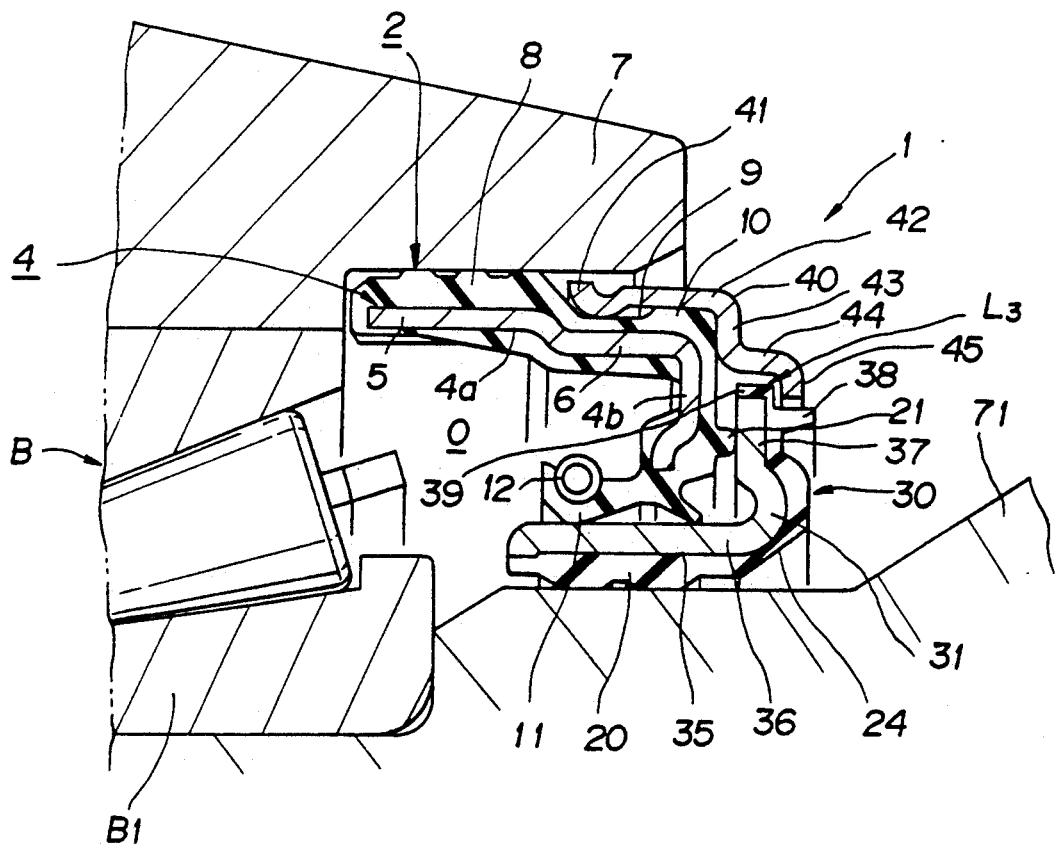
FIG. 7 is a longitudinal sectional view of the main portion showing the mounting of the device shown in FIG. 6.

The mounting condition of the sealing device thus constructed is shown in FIG. 7. As is clear from the figure, the sealing device 1 and the protection ring 40 are press-fitted. Then, a shaft 71 is inserted along the bore of an inner race B1 of a bearing B to be press-fitted into the inner periphery of the sleeve member 30. Such a construction allows either the housing 7 or the shaft 71 to rotate. In this way, the unitized seal type sealing device in which the sleeve member 30 and the seal member 2 are unitized eliminates the need for the control of surface conditions of the shaft 71 which influences the sealing performance of the seal, thereby allowing the shaft to be easily mounted. More specifically, the rubber-like elastic members provided on both sides of the periphery are well fitted into both housing 7 and shaft 71, whereby the shaft can be mounted merely by means of manual compression. Further, the seal lip 11 is protected by the sleeve member 30, thereby providing the advantage in that lip damage, adhesion of dust and other foreign matters, and deterioration of the previously applied grease can be prevented.

On the other hand, the protection ring 40 is fixed at two points; that is, at the outer end portion 41 thereof on the rubber surface of the recessed portion 9 provided on the outer periphery of the rubber portion 8 and at the increased thickness of the projected portion 10 of the rubber portion 8. This double fixing of the protection ring 40 serves to make proper adjustments so that the protection ring 40 does not become eccentric in a radial direction, does not move out in a thrust direction, is not subjected to friction due to excessive load, nor is it deformed or damaged due to contact should the shaft 71 be eccentrically rotated or mounted onto the housing 7, thrust movement be generated, and as a consequence, should an improper load be applied to the two members in relative rotation.

Figure 8A:
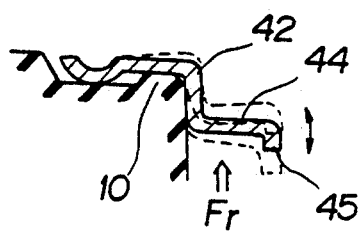
FIG. 8 is an explanatory diagram showing the operation of the protection ring of the device shown in FIG. 6; (a) is a longitudinal sectional view of the main portion thereof when the radial force Fr is applied thereto; (b) is a longitudinal sectional view of the main portion thereof when the thrust force Fs is applied thereto.
Figure 8B:
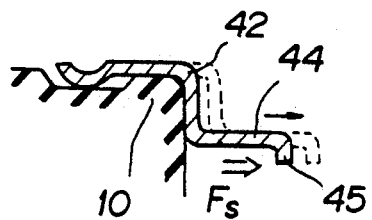
Figure 9:
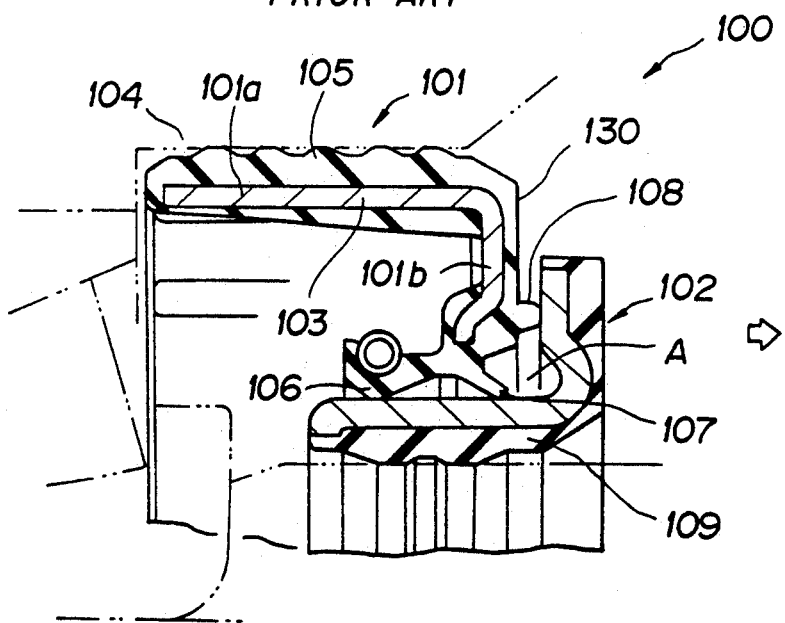
FIGS. 9 through 12 are longitudinal sectional views of the main portions of the conventional sealing devices, respectively.
Figure 10:
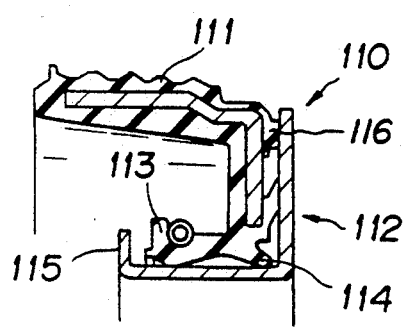
Figure 11:
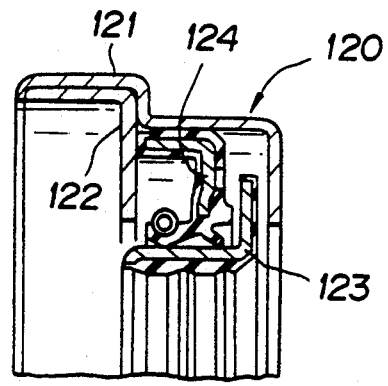
Figure 12:
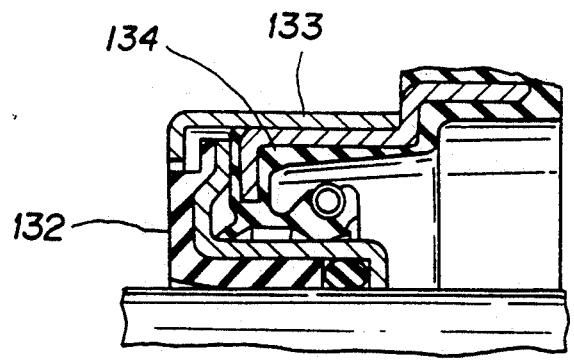

This will now be described with reference to the drawings. FIG. 8 (a) shows a state in which the eccentric rotation is readily adjustable by the contact between the flange end 37 and the force Fr; FIG. 8 (b) shows a state in which the protection ring 40 is movable by the contact between the flange end 37 and the force Fs. Other arrangement and operation are the same as in the first embodiment, and therefore the description thereof will be omitted.

According to the third embodiment, in which the sealing device comprises the protection ring 40, one end of which is fitted into the seal member 2 on the stepped outer cylindrical portion 4a of the metal ring 4, while the other end thereof is provided with a small clearance with respect to the lip 38; and the protection ring 40 covers the opening into the atmosphere formed between the seal member 2 and the sleeve member 30. Therefore, it is possible to prevent entry of dust and splashes of sludge from outside, whereby the sealing performance against dust can be significantly improved.

Further, the extended portion 44 and end portion 43 of the protection ring 40, as well as the flange end 37 and lip 38 provides the function of a labyrinth seal L3, thereby further improving the sealing performance against dust.

The protection ring 40 serves the section of making proper adjustments so that the protection ring 40 does not become eccentric in a radial direction, does not move out in a thrust direction, is not subjected to friction due to excessive load, nor is it deformed or damaged due to contact should the shaft 71 be eccentrically rotated or mounted onto the housing 7, thrust movement be generated, and as a consequence, should an improper load be applied to the two members in relative rotation. Thus, any deformation, damage, and generation of excessive heat due to sliding contact between the two members 2, 30 can be prevented, thereby providing a longstanding sealing performance.

While the invention has been particularly shown and described in reference to preferred embodiments thereof, it will be understood by those skilled in the art that changes in form and details may be made therein without departing from the spirit and scope of the invention.

What is claimed:

1. A sealing device for sealing between concentric inner and outer members which are relatively rotatable with respect to one another, the sealing device comprising:

a seal member to be mounted onto the outer member, said seal member having a side facing outward towards the atmosphere, a seal lip for sealing a liquid in slidable contact with a sleeve member, an annular projected portion having a rubber-like elastic member on a portion of the outer periphery of said seal member, and an end portion on the atmosphere side of said seal member;

a sleeve member to be mounted onto the inner member, said sleeve member having a flange portion protruding so as to face the atmosphere side of said seal member; and a protection ring overlapping said annular projected portion of said seal member having said rubber-like elastic member, said protection ring covering an opening defined between the flange portion of said sleeve member and the end portion of said seal member, said protection ring having a bent end portion for forming a substantially narrow stepped channel between said seal member and said sleeve member.

2. The sealing device according to claim 1, wherein said seal member is provided with a ring-shaped projection for slidably contacting said sleeve member on the atmosphere side of said sealing member.

3. The sealing device according to claim 1, wherein said protection ring is stepped by a greater diameter portion and a smaller diameter portion.

4. The sealing device according to claim 3, wherein the smaller diameter portion of said protection ring is provided with said bent end portion.

* * * * *